United States Patent [19]

Sikdar

[11] Patent Number: 4,558,118

[45] Date of Patent: Dec. 10, 1985

[54] TWO PHASE INTERFACIAL POLYCONDENSATION POLYCARBONATE PROCESS

[75] Inventor: Subhas K. Sikdar, Clifton Park, N.Y.

[73] Assignee: General Electric Company, Schenectady, N.Y.

[21] Appl. No.: 632,995

[22] Filed: Jul. 20, 1984

[51] Int. Cl.[4] ............................................. C08G 63/62
[52] U.S. Cl. ..................................... 528/196; 526/80; 528/198; 528/199
[58] Field of Search ..................... 528/196, 198, 199; 526/80

[56] References Cited

U.S. PATENT DOCUMENTS 4,360,659 11/1982 Sikdar .................................. 528/196
4,368,315 1/1983 Sikdar .................................. 528/196

Primary Examiner—Harold D. Anderson
Attorney, Agent, or Firm—Richard J. Traverso; James C. Davis, Jr.; James Magee, Jr.

[57] ABSTRACT

This invention relates to an improved interfacial polycondensation aromatic polycarbonate process which does not require large quantities of strong base to provide a particulate product. The process is specific to interfacial polycondensation processes wherein the polycarbonate is formed in the aqueous phase by using a low organic to aqueous phase volume ratio. The quantity of strong base required to provide a particular product is reduced by adding the aromatic dihydroxy compound to the reaction mixture in small increments. This maintains a high mole ratio of strong base to aromatic dihydroxy compound during reaction.

18 Claims, No Drawings

TWO PHASE INTERFACIAL POLYCONDENSATION POLYCARBONATE PROCESS

BACKGROUND OF THE INVENTION

This invention relates to a method of producing polycarbonate by an interfacial polycondensation process wherein the polycarbonate is formed as particulates by using a low organic to aqueous phase volume ratio. More particularly, this invention relates to an improved interfacial polycondensation polycarbonate process which does not require large quantities of strong base to produce a particulate product.

Interfacial polycondensation processes wherein the polycarbonate is formed as particulates in the liquid aqueous phase have been reported previously in U.S. Pat. Nos. 4,368,315 and 4,360,659, assigned to the same assignee as the present invention, the contents of which are incorporated herein by reference. The procedures outlined in these references utilize an agitated two-phase reaction solvent medium containing a liquid inert organic solvent phase and a liquid aqueous phase in a volume ratio within the range of from 0.04:1 to 0.20:1 during the preparation of an aromatic polycarbonate from a dihydroxy aromatic compound and carbonyl halide. These processes provide the benefits of (1) utilizing reduced amounts of inert organic solvent during the polycondensation process and (2) eliminate or reduce the use of (a) an anti-solvent in the separation and recovery of polycarbonate from the reaction environment and/or (b) steam precipitation to recover polycarbonate from the organic phase. This is permitted since substantially all the polycarbonate formed precipitates in situ in the aqueous phase.

While these processes have provided acceptable aromatic polycarbonates, there still remains room for improvement. For example, when the organic to aqueous phase ratio is about 0.05 the polycarbonate often precipitates as agglomerated solids or sticky globs rather than fine particles unless the mole ratio of strong base to aromatic dihydroxy compound is at a value of 4.0 or above. In producing polycarbonate it is desirable to maintain caustic soda usage at a minimum to reduce costs and avoid degradation of the polymer. It is a disadvantage to employ 4 moles of base per mole of aromatic dihydroxy compound when considering that interfacial polycondensation polycarbonate processes which utilize high organic to aqueous phase volume ratios provide a suitable product upon steam precipitation with less than 3 moles of base per mole of aromatic dihydroxy compound. This invention overcomes this disadvantage and does not require large quantities of base to avoid the agglomeration or glob formation of the polycarbonate product. The quantity of strong base utilized in this process relative to aromatic dihydroxy compound can be reduced to a ratio less than 4.0 with no glob formation.

SUMMARY OF THE INVENTION

This invention embodies an interfacial polycondensation polycarbonate process for producing aromatic polycarbonate comprising:

(1) forming an agitated two-phase admixture comprising
  (i) an inert organic solvent phase and
  (ii) an aqueous phase containing a strong base having a pH above 11, the volume ratio of the organic phase to aqueous phase being within the range of 0.04:1 to 0.20:1;

(2) adding an aromatic dihydroxy compound to the agitated two-phase admixture in 2 or more increments sufficient to maintain the mole ratio of strong base to aromatic dihydroxy compound above about 3.5;

(3) adding a carbonyl halide following each incremental addition of aromatic dihydroxy compound and reacting said carbonyl halide with said aromatic dihydroxy compound; within said agitated two-phase admixture and (4) recovering the solid aromatic polycarbonate from the aqueous phase.

OBJECTS OF THE INVENTION

The primary object of the present invention is to reduce the quantity of strong base necessary to produce a particulate product in interfacial polycondensation polycarbonate processes wherein the polycarbonate is formed in the aqueous phase.

DESCRIPTION OF THE PREFERRED EMBODIMENT

This invention is directed to an interfacial polycondensation aromatic polycarbonate process wherein the polycarbonate is formed in the aqueous phase in particulate form. In general, this process involves the reaction of an aromatic dihydroxy compound with a carbonyl halide, to produce aromatic polycarbonate polymers. These polycarbonate polymers are formed in the aqueous phase of a two-phase reaction medium because of the low organic phase/aqueous phase volume ratio. This volume ratio falls within the range of from 0.04:1 to 0.20:1 during the preparation of the aromatic polycarbonate and preferably falls within the range of about 0.04:1 to about 0.08:1.

The two-phase reaction solvent medium is agitated during the reaction to preferably provide a substantially uniform dispersion of the two phases. The two phases comprise an organic phase containing an inert organic solvent and, optionally, a polycondensation catalyst. The second phase is an aqueous phase which contains a strong base, preferably an alkali metal hydroxide. This aqueous phase contains a sufficient quantity of base to provide a pH of at least about 11.

An aromatic dihydroxy compound is added to this two-phase admixture and solubilized in the aqueous phase. The aromatic dihydroxy compound is added in increments prior to and during the course of the reaction. These increments are sufficiently small so as to maintain the mole ratio of strong base to aromatic dihydroxy compound at a value above 3.5. This high ratio is desired so as to maintain the unreacted dihydroxy compound soluble within the aqueous phase. This high ratio also prevents the formation of sticky globs when precipitating the polycarbonate polymer produced. By introducing the aromatic dihydroxy compound in increments, the quantity of strong base necessary to maintain this high ratio can be reduced.

Upon addition of aromatic dihydroxy compound to the agitated two-phase admixture, a carbonyl halide is added to this admixture to initiate reaction with the aromatic dihydroxy compound and produce polycarbonate polymers. The reaction consumes the aromatic dihydroxy compound, thereby increasing the mole ratio of strong base/aromatic dihydroxy compound. This permits further addition of aromatic dihydroxy compound to the two-phase admixture. The quantity introduced to this admixture is limited to values which provide a mole ratio of strong base/aromatic dihydroxy compound above about 3.5. Although this ratio is maintained at a value above about 3.5 during reaction, the actual ratio of base/aromatic dihydroxy compound utilized in the reaction will be less than the ratio maintained because additional aromatic dihydroxy compound is added during the reaction. The actual ratio may be reduced significantly below 3.5 due to the efficient use of base that is inherent in this process.

The polycondensation reaction produces a Bronstead acid, H—X (wherein X=halogen), along with the polycarbonate polymer. This Bronstead acid is neutralized by the base present in the agitated two phase admixture. Two moles of base are consumed in neutralizing the acid per mole of aromatic dihydroxy compound polymerized. Therefore, replenishing the reaction mixture with a quantity of aromatic dihydroxy compound equivalent to the quantity consumed will reduce the mole ratio of strong base to aromatic dihydroxy compound. To avoid reducing this mole ratio below the value of 3.5, the incremental additions of aromatic dihydroxy compound must often be smaller than the quantities consumed by the polycondensation reaction. The size of the increments may gradually decrease such as, for example, 0.5 moles, 0.25 moles, etc. Incremental additions of aromatic dihydroxy compound and the addition of carbonyl halide to the agitated two-phase admixture may be continued until the pH of the admixture falls below 11 due to the consumption of base.

The aromatic polycarbonate polymer produced is in the form of a precipitate within the aqueous phase. This precipitate is separated and recovered by conventional means known to those skilled in the art, such as suction filtration and the like.

To prevent the mole ratio of strong base to aromatic dihydroxy compound from falling below the value of 3.5, additional quantites of strong base may be added with the aromatic dihydroxy compound. Supplementing the quantity of strong base within the two-phase admixture may be desired where the pH falls below 11. Where it is undesirable to maintain a high strong base/aromatic dihydroxy compound mole ratio within the agitated two-phase admixture during the initial stages of the reaction, supplemental additions of strong base may be relied on to maintain the mole ratio above a value of 3.5. Without supplemental additions of the strong base, either the initial mole ratio will be very high, i.e. about 5.0, or subsequent increments of aromatic dihydroxy compound must decrease in size, often below about 25% of the previous increment.

The organic phase of the two-phase admixture comprises an inert organic solvent. Any inert organic solvent can be used, including non-polar solvents and medium polar solvents, such as heptane, benzene, toluene, xylene, chlorobenzene, bromobenzene, orthodichlorobenzene, methylene chloride, 1,2-dichloroethane, iodobenzene, and the like including mixtures thereof. Preferably, the solvents employed are halogenated hydrocarbons, more preferably methylene chloride.

The organic phase may contain a polycondensation catalyst. This polycondensation catalyst can be any hydrogen halide acceptor commonly employed in interfacial polycondensation reactions. Illustrative of well-known catalysts are the following; trimethylamine, triethylamine, allyldiethylamine, benzyl dimethylamines, dioctylbenzylamine, dimethylphenethylamine, 1-dimethylamino-2-phenylpropane, N,N,N',N'-tetramethylethylenediamine, N-methylpiperidine, 2,2,6,6-N-pentamethylpiperidine and the like, the presently preferred catalysts of the class are the aliphatic amines, especially triethylamine.

Any amount of polycondensation catalyst can be employed. However, generally, effective mole proportions relative to the dihydroxy aromatic compound are within the range of from about 0.25% to about 2% and are more preferably within the range of about 0.5% to about 1% per mole of aromatic dihydroxy compound. The desired quantity of polycondensation catalyst may be introduced to the reactor in its entirety prior to the reaction or the catalyst may be fed in increments as needed with the aromatic dihydroxy compound, preferably as part of an organic solution.

A phase transfer catalyst can be employed in the reaction if desired and is typically within the aqueous phase. The use of such transfer agents is optional and not essential for the practice of this invention. Examples of phase transfer catalysts are low molecular weight (less than 10 carbon atoms) quaternary ammonium, quaternary phosphonium and tertiary sulfonium compounds or mixtures thereof. These are described in detail by Stark in J.A.C.S. 93 (1971) and U.S. Pat. No. 4,201,721 whose descriptions are incorporated herein in their entirety by reference.

Representative of the basic species which can be employed within the aqueous phase are the following: basic quaternary ammonium, quaternary phosphonium or tertiary sulfonium hydroxides; alkali metal hydroxides and the like including mixtures thereof. Specific examples include tetramethylammonium hydroxide, tetraethylphosphonium hydroxide, etc.; lithium hydroxide, sodium hydroxide, potassium hydroxide, etc. Specially preferred are sodium or potassium hydroxide.

Any amount of base can be employed subject to the proviso that the aqueous phase is maintained at a pH value in excess of about 11, preferably within the range of 12 to 13.5 and optionally, as high as 14. Although the ratio of strong base to aromatic dihydroxy compound is maintained at a ratio of 3.5 in the process of this invention, the actual mole proportions of base relative to the aromatic dihydroxy compounds utilized can fall within the range of about 2.25:1 to about 5.0:1. Although it is desirable to maintain the quantity of strong base utilized as small as possible, mole proportions in the range of about 2.4:1 to 2.7:1 are frequently preferred. Caustic usage within this range is comparable to that utilized in other processes which produce aromatic polycarbonate. By maintaining caustic usage within this range, the aromatic dihydroxy compound need not be added to the two-phase admixture in an large number of increments. This is undesirable since the larger the number of incremental additions, the longer the residence time within the reactor.

The aqueous phase may also contain an ionic surfactant. Either anionic or cationic surfactants can be utilized as described with greater particularity in copending application Ser. No. 600,634 filed, 4-16-84, now U.S. Pat. No. 4,515,939, 5-7-85, which is incorporated herein by reference. The preferred surfactants include sodium lauryl sulfate, dodecyltrimethylammonium bromide and cetyltrimethylammonium bromide and the like. The preferred quantity of surfactant within the aqueous phase typically falls within the range of about 100 to 1000 parts per million. A quantity within the range of 400 to 600 parts per million is most preferred for the more common surfactants, such as sodium lauryl sulfate and dodecyltrimethylammonium bromide.

The polycarbonates prepared by the process described herein, are preferably, non-sterically-hindered aromatic polycarbonates ("NSH-aromatic-PC") and include compounds well known to those skilled in the art.

The expression "NSH-aromatic-PC" as employed herein and in the claims includes aromatic polycarbonates containing a major portion of NSH-polycarbonate moieties (derived from non-sterically-hindered dihydroxy aromatic compounds with the remaining portion comprising sterically-hindered polycarbonate moieties (derived from sterically-hindered dihydroxy aromatic compounds). A major portion being defined as more than 50 mole % of the polycarbonate moieties. The NSH-aromatic-PC frequency have about 90–100 mole % non-sterically-hindered polycarbonate moieties.

The expression "non-sterically-hindered dihydroxy aromatic compounds" include any dihydric phenol free of steric hindrance, i.e. dihydroxy compounds having neither hydroxy group sterically hindered by the presence of a halogen, hydrocarbon or hydrocarbonoxy group at both ortho-positions relative to a hydroxy group. Conversely, sterically-hindered dihydroxy compounds are defined herein as dihydric phenols having a halogen, hydrocarbon or hydrocarbonoxy group at both ortho-positions relative to a hydroxy group of said dihydroxy phenol.

These NSH-dihydroxy aromatic compounds are well-known to those skilled in the art as illustrated by Fox in U.S. Pat. No. 3,153,008 and can be illustrated by the formula below:

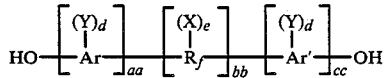

I

In Formula I, $R_f$ is selected from (a) a group of hydrocarbon linkages consisting of alkylene, alkylidene (including "vinylidene", cycloalkylene, cycloalkylidene) and arylene linkages and mixtures thereof and (b) a linkage selected from the group consisting of ether, amine, carbonyl, sulfur, and phosphorous linkages. Ar and Ar' are arene radicals and Y is a monovalent radical selected from a group consisting of bromine, chlorine, alkyl and alkoxy radicals. Each d represents a whole number from zero to a maximum equivalent to the number of replaceable hydrogens substituted on the aromatic rings comprising Ar and Ar', subject to the proviso that when d is equal to 2 or more, no more than one Y group is ortho-positioned relative to an OH group. The monovalent radical X is selected from the group consisting of bromine, chlorine, alkyl, aryl and cycloalkyl radicals and mixtures thereof. The symbol e represents a whole number of from zero to a maximum controlled by the number of replaceable hydrogens on $R_f$. The symbols as, bb and cc represent whole numbers including 0 with the proviso that when bb is greater than 0, neither aa nor cc may be 0 and when bb is 0, either aa or cc may be 0, but not both.

Included in the NSH-dihydric aromatic compounds of formula I are those described in greater detail in U.S. Pat. No. 4,368,315 of Subhas K. Sikdar at columns 3 and 4, which—for purposes of brevity—are incorporated herein in their entirety by reference. Some specific examples of some NSH-dihydric phenols are, for example, the following:

4,4'-dihydroxy-diphenyl;
4,4'-dihydroxy-diphenyl methane;
4,4'-dihydroxy-diphenyl-1,1-ethane;
4,4'-dihydroxy-diphenyl-1,1-butane;
4,4'-dihydroxy-diphenyl-1,1-isobutane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl ether;
4,4'-dihydroxy-diphenyl sulfide;
4,4'-dihydroxy-diphenyl sulfoxide;
4,4'-dihydroxy-diphenyl sulfone;
2,2-bis(4-hydroxy-phenyl)-1,1-dichloroethylene; and
2,2-bis(4-hydroxy-phenyl)-1,1-dibromoethylene.

Some specific examples of the SH-dihydroxy aromatic compounds that are optionally employed in the practice of this invention (also referred to as SH-dihydric phenols include the following:

2,2-bis(3-methyl-5-ethyl-4-hydroxyphenyl)propane;
2,2-bis(3,5-dibromo-4-hydroxyohenyl)propane;
2,2-bis(3,5-diisopropyl-4-hydroxyphenyl)propane;
2,2-bis(4-hydroxy-3,5-dimethylphenyl)propane; and
2,2-bis(3,5-dimethyl-4-hydroxyphenyl)-1,1-dichloroethylene.
1,1-bis(4-hydroxy-3,5-dimethylphenyl)methane;
1,1-bis(3,5-diethyl-4-hydroxyphenyl)methane;
1,1-bis(3,5-diisopropyl-4-hydroxyphenyl)methane;
1,1-bis(3,5-dibromo-4-hydroxyphenyl)methane;
1,1-bis(3,5-dimethyl-4-hydroxyphenyl)ethane;
1,1-bis(3-methyl-5-ethyl-4-hydroxyphenyl)ethane;
1,1-bis(3,5-diethyl-4-hydroxyphenyl)ethane;
2,4'-dihydroxy-3,3',5,5'-tetramethyldiphenyl) methane;
2,4'-dihydroxy-3,3',5,5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2-bis(3,5-dimethyl-4-hydroxyphenyl)-1-chloroethylene;
2,2-bis(3,5-dibutoxy-4-hydroxyphenyl)-1-1-dibromoethylene, etc.

The non-sterically-hindered aromatic polycarbonates prepared by the process comprising this invention may be illustrated by the formula below:

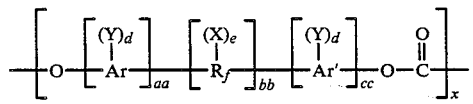

wherein $R_f$, Ar, Ar', Y, d, X, e, aa, bb, and cc are as defined above and x is a number of at least 10, preferably from 2 to 200 or higher, and often more preferably from 30 to 100.

Presently preferred non-sterically-hindered aromatic polycarbonate segments are illustrated by the formulas:

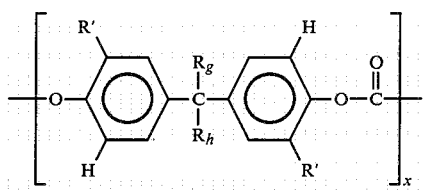

and

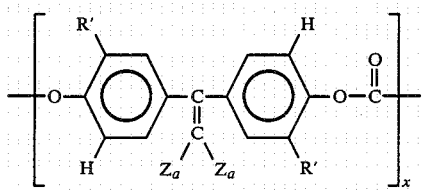

where independently each R' is selected from a group of monovalent radicals consisting of hydrogen, bromine, chlorine, alkyl radicals of from 1 to 4 carbon atoms and alkoxy radicals of from 1 to 4 carbon atoms. The monovalent radicals $R_g$ and $R_h$ are selected from the group consisting of hydrogen and alkyl radicals of from 1 to 2 carbon atoms. Each $Z_a$ is selected from the group consisting of hydrogen, bromine and chlorine, subject to the proviso that at least one $Z_a$ is chlorine or bromine. The symbol x is a number of at least 10, preferably from 20 to 200 or higher and often more preferably from 30 to 100.

The expression "carbonyl halides" as employed herein and in the claims includes carbonyl dichloride, more commonly known as phosgene; carbonyl dibromide; carbonyl diiodide; carbonyl difluoride; carbonyl cholorofluoride; including mixtures thereof.

Any amount of functionally reactive dihydroxy aromatic compound and carbonyl halides can be employed. Generally, the carbonyl halide is present in stoichiometric amounts at least sufficient to react with the hydroxy groups associated with the dihydroxy compound. Preferably, the carbonyl halide is present in excess, i.e. in amounts of at least about 1.01 to 1.5 times the stoichiometric amounts required to completely couple all the reactive aromatic dihydroxy compounds to form the desired aromatic polycarbonates. The most preferred quantity of carbonyl halide falls within the range of about 1.05 to about 1.15 times the stoichiometric quantity described above.

A chain stopper may optionally be introduced into the two-phase admixture to control the degree of polymerization. Any monohydroxy compound is suitable for terminating the chain propagation. Aromatic monohydroxy compounds are preferred. Representative examples of such chain terminators are the following: phenol, alkyl-substituted phenols, halo-substituted phenols, alkoxy-substituted phenols and the like. The most preferred chain terminator is phenol, which is typically dissolved within the organic phase of the two-phase admixture. The desired quantity of phenol may be added to the reactor in its entirety prior to the reaction or it may be introduced in increments as needed.

The quantity of chain stopper relative to the quantity of dihydroxy aromatic compound, preferably ranges from about 0 to 3 mole % of said aromatic dihydroxy compound. Higher concentrations of chain stopper can be utilized, but significantly inhibit the production of the desired high moelcular weight aromatic polycarbonates.

The reactions can be carried out at any temperature, up to the reflux temperature of the inert organic solvent phase. Preferably, temperatures within the range of about 0° to 40° C., or higher, are utilized. Most preferably, temperatures from about 15° to 25° C. are employed.

The two phase mixture is agitated during addition of the carbonyl halide and during the reaction period until substantially complete. The aromatic polycarbonates produced have a weight average molecular weight ($\overline{M}_W$) of at least about 2000 and a $\overline{M}_W/\overline{M}_N$ of less than about 6.0. The preferred value for $\overline{M}_W$ falls within the range of about 5000 to 100,000. The most preferred value for $\overline{M}_W$ is about 10,000 to 50,000 and the preferred $\overline{M}_W/\overline{M}_N$ ratio falls within the range of from about 2.00 to 3.75. Polycarbonates of such molecular weight characteristics process easily between about 450° F. and 650° F. and are generally suitable raw materials for the manufacture of filaments, fibers, films, sheets, laminates and other thermoplastic articles of manufacture including reinforced articles employing conventional molding, extruding, etc. manufacturing techniques.

The following examples are provided to further illustrate the invention. It is not intended to limit the scope of this invention to their contents.

EXAMPLE 1

To a 4 liter beaker were added about 1100 ml of deionized water, 70 ml of methylene chloride, 1.75 moles sodium hydroxide (92 ml 50% NaOH), 1.41 grams of phenol chain stopper, 0.25 grams of triethylamine polycondensation catalyst (0.5 mole percent) and 114 grams of bisphenol-A. The first incremental addition of bisphenol-A was equivalent to 0.5 moles. The two phase admixture with bisphenol-A was agitated at 745 rpm during phosgene addition. Phosgene was introduced at 3.8 grams per minute at 15°–20° C.

Ten minutes after the phosgene was initially introduced into the reactor, a 57 gram increment of bisphenol-A was fed into the reactor in a solution comprising 150 ml of water and 20 ml of 50% NaOH. An additional 0.7 grams phenol and 0.125 grams triethylamine were also introduced. All remaining reaction conditions were the same.

At twenty minutes after the initiation of phosgene to the reactor, a similar 57 gram increment of bisphenol-A in a solution comprising 150 ml H$_2$O and 20 ml 50% NaOH was introduced into the reactor. An additional 0.7 grams phenol and 0.125 grams triethylamine were also added.

The mole ratio of sodium hydroxide to bisphenol-A during reaction was maintained at about 3.5. The weight ratio of methylene chloride to bisphenol-A was 0.47. The phase ratio of organic to aqueous liquid solvent was 0.06.

Aromatic polycarbonate precipitated within the aqueous solution early in the reaction. The precipitate was in the form of fine particles, no agglomerated solids or sticky globs were observed. The overall NaOH usage was 2.5 moles per mole of bisphenol-A. The 15 minute sample of Example 1 had an intrinsic viscosity of 0.35 and a final sample has an intrinsic viscosity of 0.26.

COMPARATIVE EXAMPLE

This example compares a process wherein high caustic usage results in agglomerated particles as a precipitated polycarbonated product due to a low base/aromatic dihydroxy compound mole ratio during reaction.

To a four liter beaker were added about 1400 ml deionized water, 30 ml methylene chloride, 2.3 moles of sodium hydroxide, 2.8 grams of phenol chain stopper, triethylamine as a 2.5% solution in 60 ml of methylene chloride and 228 grams bisphenol-A (1 mole). The two phase admixture was agitated vigorously while phosgene was added for 30 mintues at a rate of 3.8 grams per minute. After ten minutes from the start of the phosgene addition, 1.7 moles of sodium hydroxide were added to the mixture. Sticky chunks appeared early in the reaction and proceeded to form until the reaction was complete.

The initial sodium hydroxide/bisphenol-A mole ratio during reaction was 2.3, the overall caustic usage was 4.0 moles sodium hydroxide per mole of aromatic dihydroxy compound.

COMPARATIVE EXAMPLE

This example compares a process wherein a particulate polycarbonate product is obtained utilizing a large quantity of strong base because a high base/aromatic dihydroxy compound mole ratio is maintained during reaction.

To a 4 liter beaker were added 1400 ml of deionized water, 30 ml of methylene chloride, 4 moles of sodium hydroxide and 1 mole (228 grams) of bisphenol-A. The two phase admixture also contained 2.8 grams phenol chain stopper with triethylamine polycondensation catalyst as a 2.5% solution in 60 ml of methylene chloride. Phosegene was introduced into the agitated two phase admixture at a rate of 3.8 grams per minute for 30 minutes.

The initial NaOH/bisphenol-A mole ratio was 4.0 and the overall caustic usage was 4 moles of sodium hydroxide per mole of bisphenol-A. The polycarbonate product was in the form of a particulate precipitate which was filtered and dried at 60° C. in an oven overnight. The intrinsic viscosity of the polymer was 0.32 dl/g.

The above examples illustrate only a few of the embodiments within the scope of this invention, the present invention further includes other embodiments which are described more particularly in the detailed description of the invention. Modifications of the embodiments described in the Examples are possible by one skilled in the art without departing from the scope and spirit of this invention.

What is claimed is:

1. A method of producing aromatic polycarbonate by an interfacial polycondensation polycarbonate process comprising:
(A) forming an agitated two-phase admixture comprising
   (1) an inert organic solvent phase and
   (2) an aqueous phase containing a strong base having a pH above 11, the volume ratio of the organic phase to aqueous pahse being within the range of 0.04:1 to 0.20:1;
(B) adding an aromatic dihydroxy compound to the agitated two-phase admixture in 2 or more increments sufficient to maintain the mole ratio of strong base to aromatic dihydroxy compound above about 3.5;
(C) adding a carbonyl halide following each incremental addition of aromatic dihydroxy compound and reacting said carbonyl halide with the aromatic dihydroxy compound within said agitated two-phase admixture and
(D) recovering solid aromatic polycarbonate from the aqueous phase.

2. A method as in claim 1 wherein the aromatic dihydroxy compound is added to the agitated two-phase admixture in quantities which provide a mole ratio of strong base to aromatic dihydroxy compound within the range of above about 3.5 to 4.5.

3. A method as in claim 1 wherein the total quantity of aromatic dihydroxy compound added to said agitated two-phase admixture provides a mole ratio of strong base to aromatic dihydroxy compound consumed within the range of about 2.25:1 to about 5.0:1.

4. A method as in claim 3 wherein the total quantity of aromatic dihydroxy compound added to said agitated two-phase admixture provides a mole ratio of strong base to aromatic dihydroxy compound consumed within the range of about 2.4:1 to 2.7:1.

5. A method as in claim 1 wherein the pH of the two phase is admixture maintained with the range of 11 to 14.

6. The claim 1 process wherein the aromatic dihydroxy compound has the formula,

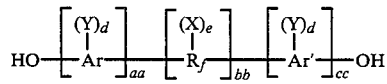

wherein $R_f$ is selected from (a) a group of hydrocarbon linkages consisting of alkylene, alkylidene, cycloalkylene, cycyloalkylidene and arylene linkage and mixtures thereof, and (b) a linkage selected from the group consisting of ether, carbonyl, amine, sulfur and phosphorous linkages; Ar and Ar' are arene radicals; Y is a monovalent radical selected from bromine, chlorine, alkyl and alkoxy radicals; each d represents a whole number from zero up to a maximum equivalent to the number of replaceable hydrogens substituted on the aromatic rings comprising Ar and Ar', subject to the proviso that, when d is equal to 2 or more, no more than one Y group is ortho-positioned relative to an OH group; X is a monovalent radical selected from the group consisting of bromine, chlorine, alkyl, aryl, and cycloalky radicals and mixtures thereof; e represents a whole number of from zero to a maximum of the number of replaceable hydrogens on $R_f$; aa, bb and cc represent whole numbers including zero, with the proviso that when bb is not zero, neither aa nor cc are zero, and when bb is zero, aa or cc but not both include zero.

7. The claim 2 process wherein the dihydric phenol is of the formulas

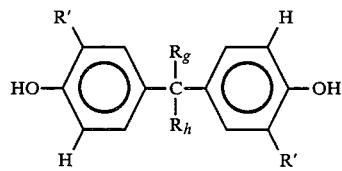

or,

-continued

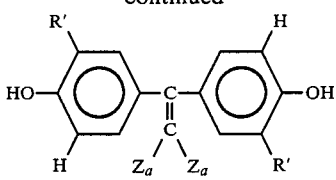

where independently each R' is selected from the group consisting of hydrogen, bromine, chlorine, alkyl radicals of from 1 to 4 carbon atoms and alkoxy radicals of from 1 to 4 carbon atoms, $R_g$ and $R_h$ are selected from the group consisting of hydrogen and alkyl radicals of from 1 to 2 carbon atoms, each $Z_a$ is selected from the group consisting of hydrogen, chlorine and bromine, subject to the proviso that at least one $Z_a$ is chlorine or bromine.

8. The claim 7 process wherein the aromatic dihydroxy compound is 4,4'-dihydroxy-diphenyl-2,2-propane.

9. A method as in claim 8 wherein the carbonyl halide is phosgene.

10. The claim 8 process wherein the strong base is an alkali metal hydroxide.

11. A method as in claim 10 wherein the strong base utilized is selected from the group consisting of potassium hydroxide and sodium hydroxide.

12. A method as in claim 1 wherein a polycondensation catalyst is introduced into the two-phase admixture.

13. A method as in claim 12 wherein the polycondensation catalyst is selected from the group consisting of trimethylamine, triethylamine, allyldiethylamine, dimethylphenyethylamine and N,N,N',N'-tetramethylethylenediamine.

14. A method as in claim 1 wherein the volume ratio of the organic phase to aqueous phase is within the range of 0.04:1 to 0.08:1.

15. A method as in claim 1 wherein the agitated two-phase admixture contains an ionic surfactant selected from the group consisting of sodium lauryl sulfate, dodecyl-triethylammonium bromide, and cetyl trimethylammonium bromide.

16. A method of producing aromatic polycarbonate by an interfacial polycondensation polycarbonate process comprising:
(A) forming an agitated two-phase admixture comprising
  (1) an organic phase containing methylene chloride and a polycondensation catalyst;
  (2) an aqueous phase containing sodium hydroxide having a pH above 11,
the volume ratio of the organic phase to the aqueous phase being within the range of about 0.04:1 to 0.20:1;
(B) adding bisphenol-A to the agitated two-phase admixture in 2 or more increments sufficient to maintain the mole ratio of sodium hydroxide to bisphenol-A above about 3.5;
(C) adding phosgene following each incremental addition of bisphenol-A and reacting phosgene with said bisphenol-A within said agitated two-phase admixture and
(D) recovering solid aromatic polycarbonate from the aqueous phase.

17. A method as in claim 16 wherein the bisphenol-A is added in a number of increments falling within the range of 2 to 5.

18. A method as in claim 17 wherein the polycondensation catalyst is triethylamine.

* * * * *